US008174216B2

(12) United States Patent
Lin

(10) Patent No.: US 8,174,216 B2
(45) Date of Patent: May 8, 2012

(54) CONTAINER WITH AUTOMATIC OPENING LID

(76) Inventor: Tsong-Yow Lin, Taichung Hsien (TW)

( * ) Notice: Subject to any disclaimer, the term of this patent is extended or adjusted under 35 U.S.C. 154(b) by 394 days.

(21) Appl. No.: 12/499,204

(22) Filed: Jul. 8, 2009

(65) Prior Publication Data

US 2011/0006060 A1 Jan. 13, 2011

(51) Int. Cl.
*H02P 1/00* (2006.01)

(52) U.S. Cl. ........................................ 318/282; 318/453

(58) Field of Classification Search .................. 318/282, 318/283, 286, 450, 453

See application file for complete search history.

(56) References Cited

U.S. PATENT DOCUMENTS

| | | | | |
|---|---|---|---|---|
| 4,981,275 | A * | 1/1991 | Sheu | 248/147 |
| 4,996,467 | A * | 2/1991 | Day | 318/480 |
| 5,158,199 | A * | 10/1992 | Pontius | 220/825 |
| 6,719,194 | B2 * | 4/2004 | Richards | 232/43.1 |
| 7,256,694 | B2 * | 8/2007 | Papari et al. | 340/565 |
| 2007/0125792 | A1 * | 6/2007 | Pollack et al. | 220/908.2 |
| 2007/0266637 | A1 * | 11/2007 | McGowan | 49/349 |

FOREIGN PATENT DOCUMENTS

| | | |
|---|---|---|
| TW | M317423 | 8/2007 |

* cited by examiner

*Primary Examiner* — Rina Duda

(57) ABSTRACT

A lid assembly for a container includes a lid engaging device, a transmission assembly mounted on the lid engaging device, and a lid including a first pivotal section and a second pivotal section disposed opposed to each other. The first and second pivotal sections define an imaginary axis "A" extended therebetween, and the first and second pivotal sections are mounted on the lid engaging device. The first pivotal section is engaged with the transmission assembly. The lid is pivoted automatically by the transmission assembly. The lid is pivotal about the imaginary axis "A" and is moveable between an open position that enables items to be put in the container and a closed position in which the lid prevents items to be put in the container.

13 Claims, 11 Drawing Sheets

CONTAINER WITH AUTOMATIC OPENING LID

BACKGROUND OF THE INVENTION

1. Field of the Invention

The present invention relates to a container including a lid which can be opened and closed automatically.

2. Description of the Related Art

Taiwan Pat. No. M317423 shows a trash can including an automatic opening lid. The lid is adapted to be automatically opened by a driving device. The driving device includes a driving member, a transmission assembly including a first transmission member engaged with the driving member and a second transmission member engaged with the first transmission member. The lid includes a first edge hinged to the driving device and a second edge which is a free end and is opposite to the first edge. The second transmission member is mounted in proximity to the first edge and connects the lid to the driving device. Thus, the driving device is adapted to open the lid as the driving member drives the first transmission member and the first transmission member drives the second transmission member Like a conventional trash can with an automatic opening lid, the first edge of the lid and the second transmission member define a first distance, and the second edge of the lid and the second transmission member define a second distance that is much greater than the first distance. Thus, forces, i.e. weight of the lid, acting against the driving device has a longer leverage distance, and the driving device is subject to a high load in order to open the lid, and elements of the driving device are liable to be damaged after all repeated use.

The present invention is, therefore, intended to obviate or at least alleviate the problems encountered in the prior art.

SUMMARY OF THE INVENTION

According to the present invention, a lid assembly for a container includes a lid engaging device, a transmission assembly mounted on the lid engaging device, and a lid including a first pivotal section and a second pivotal section disposed opposed to each other. The first and second pivotal sections define an imaginary axis "A" extended therebetween, and the first and second pivotal sections are mounted on the lid engaging device. The first pivotal section is engaged with the transmission assembly. The lid is pivoted automatically by the transmission assembly. The lid is pivotal about the imaginary axis "A" and is moveable between an open position that enables items to be put in the container and a closed position in which the lid prevents items to be put in the container.

The lid includes a first portion and a second portion on two sides of the imaginary axis "A". The first portion has a first weight and the second portion has a second weight, respectively. Additionally, the first weight is equal to the second weight. Thus, the pivoting of the lid is stable and balanced.

In the preferred embodiment, the first portion has the same dimension as the second portion. The imaginary axis "A" extends transversely to an imaginary axis "B" and crosses at an intersection. The imaginary axis "B" extends between first and second points on the circumferential edge of the lid. The intersection is spaced from the first point at a first radial distance and is spaced from the second point at a second radial distance, respectively. Additionally, the first radial distance is equal to the second radial distance.

DETAILED DESCRIPTION OF THE PREFERRED EMBODIMENT

Figure 1:
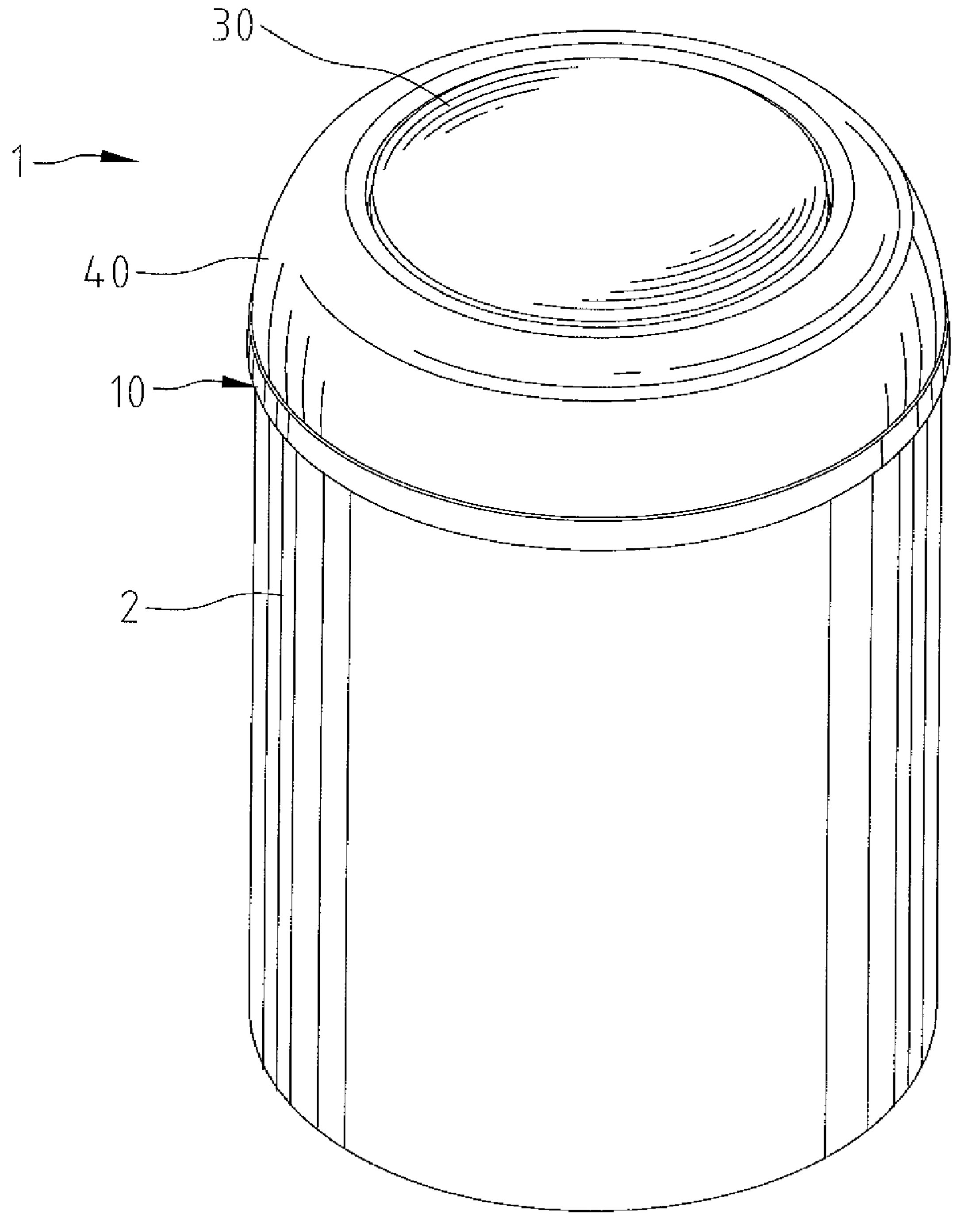
FIG. 1 is a perspective view of a container in accordance with the present invention, and the container includes an automatic opening lid.
Figure 2:
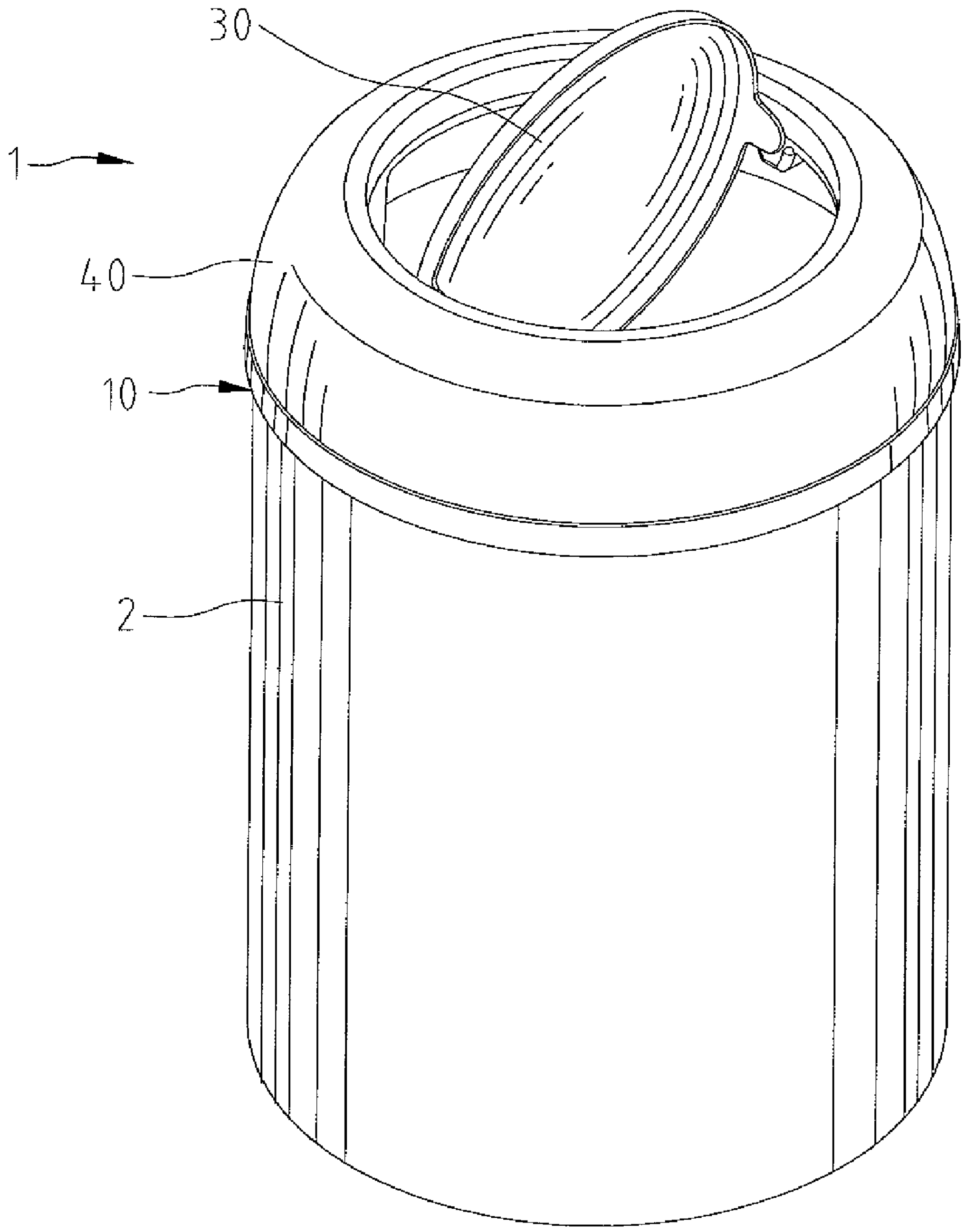
FIG. 2 is another perspective view of the container shown in FIG. 1, with the lid in an open position.
Figure 3:
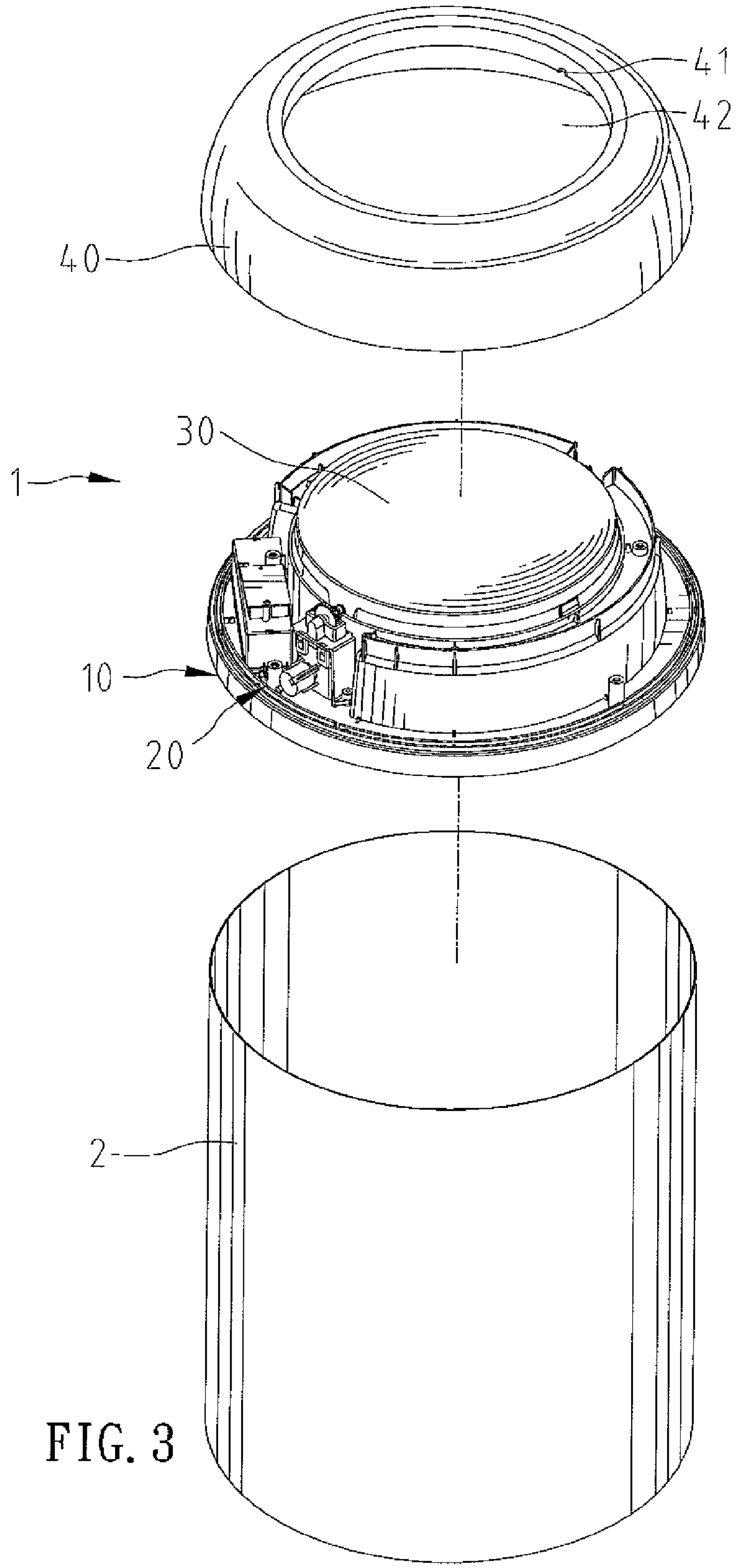
FIG. 3 is an exploded perspective of the container shown in FIG. 1.
Figure 4:
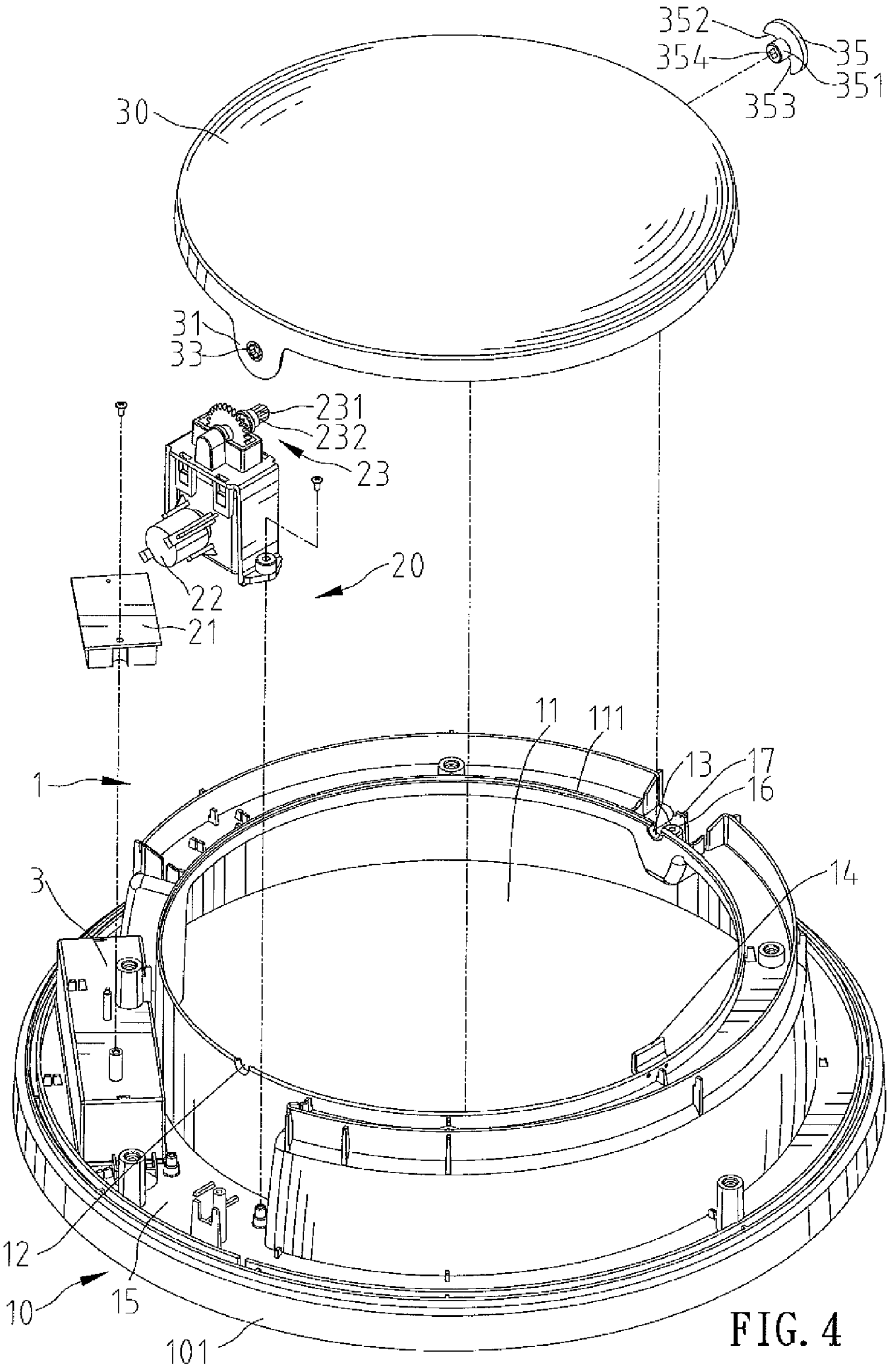
FIG. 4 is an exploded perspective view of a lid and a lid engaging device shown in FIG. 3.
Figure 5:
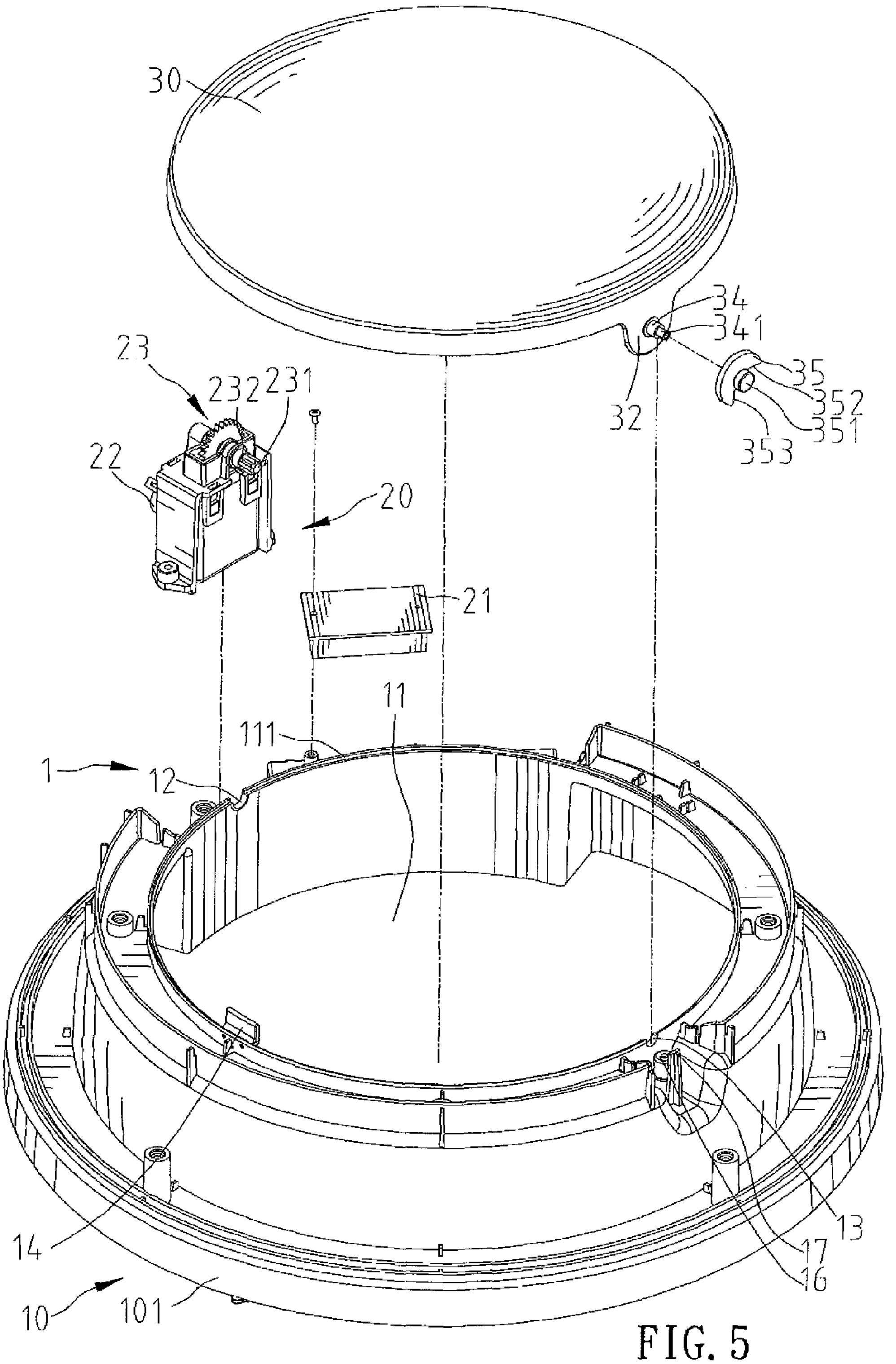
FIG. 5 is another perspective view of the lid and the lid engaging device taken from a different angle view.
Figure 6:
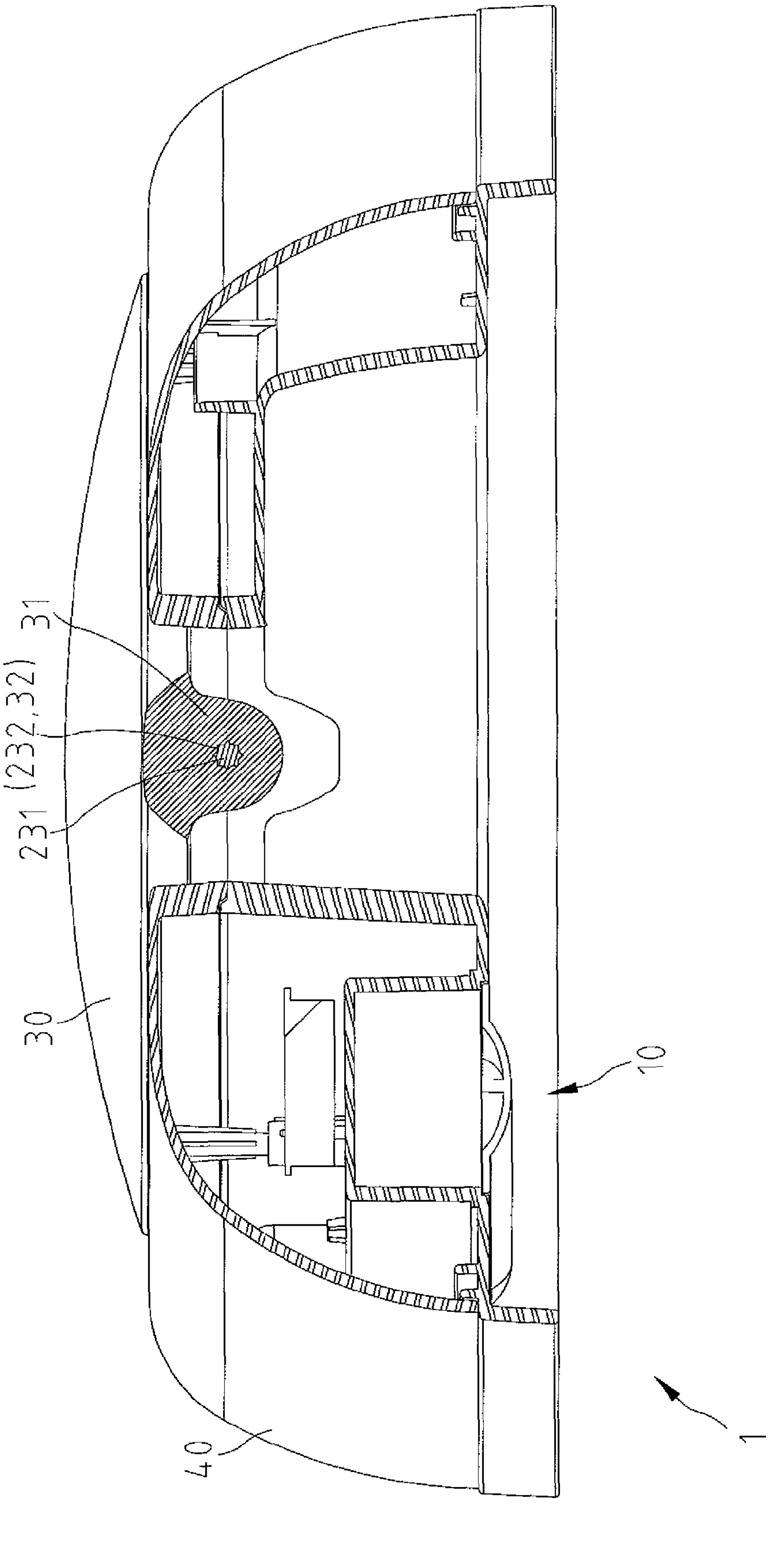
FIG. 6 is a cross-sectional view of the lid, the lid engaging device and a protection cap.
Figure 7:
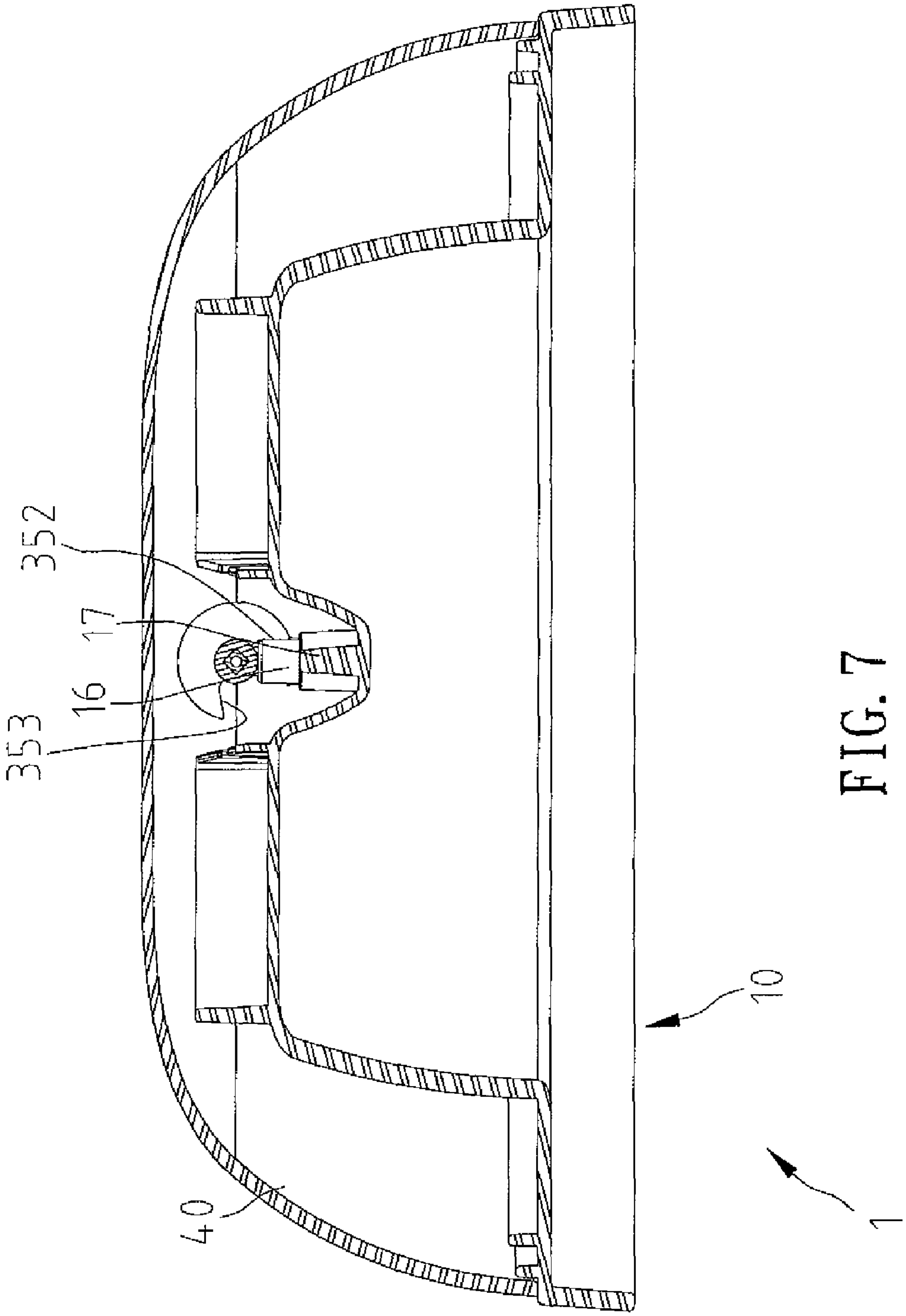
FIG. 7 is another cross-sectional view of the lid, the lid engaging device and the protection cap.
Figure 8:
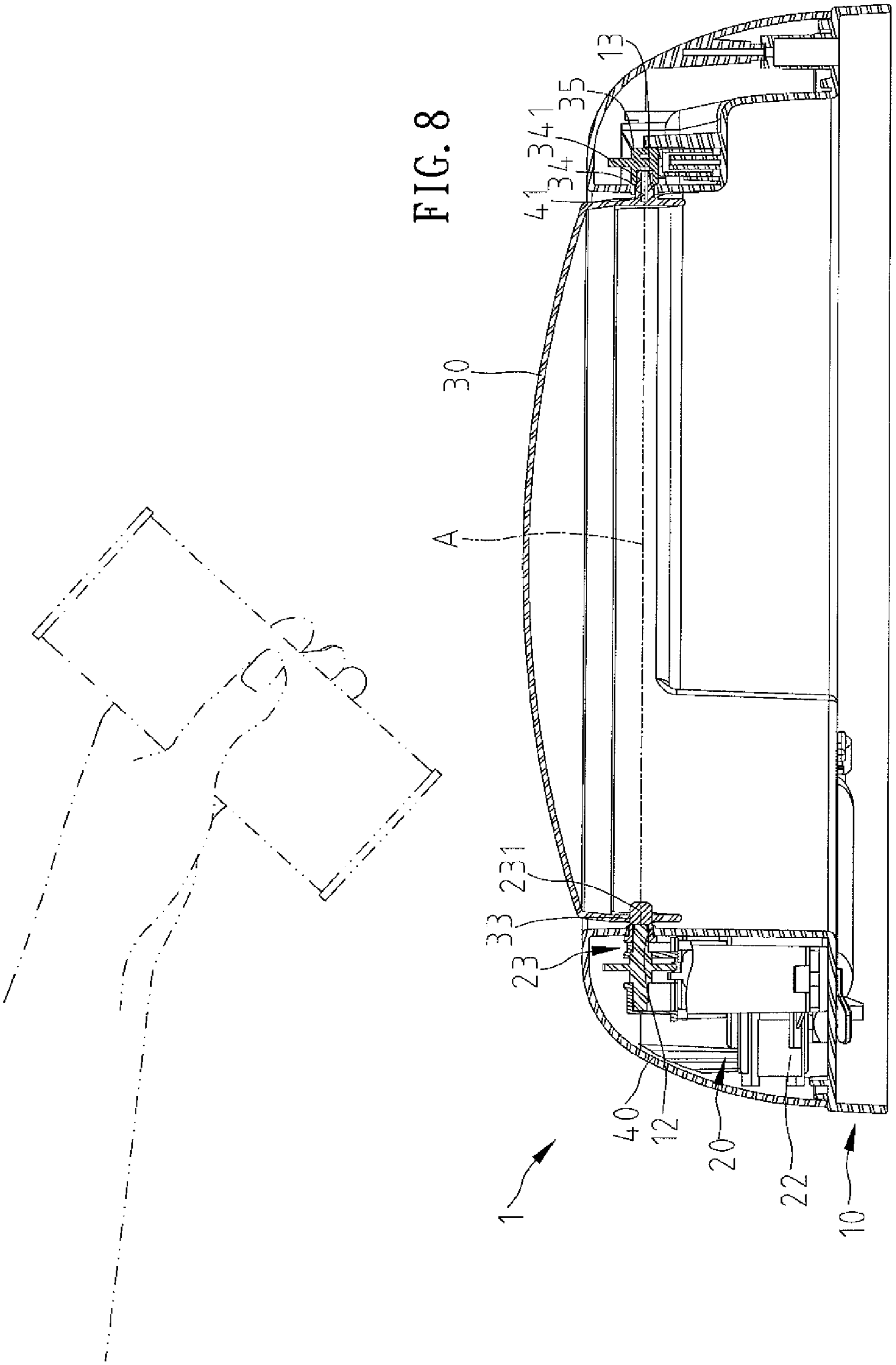
FIG. 8 is a further cross-sectional view of the lid, the lid engaging device and the protection cap, and shows an item to be put in the container, with the item shown in phantom.
Figure 9:
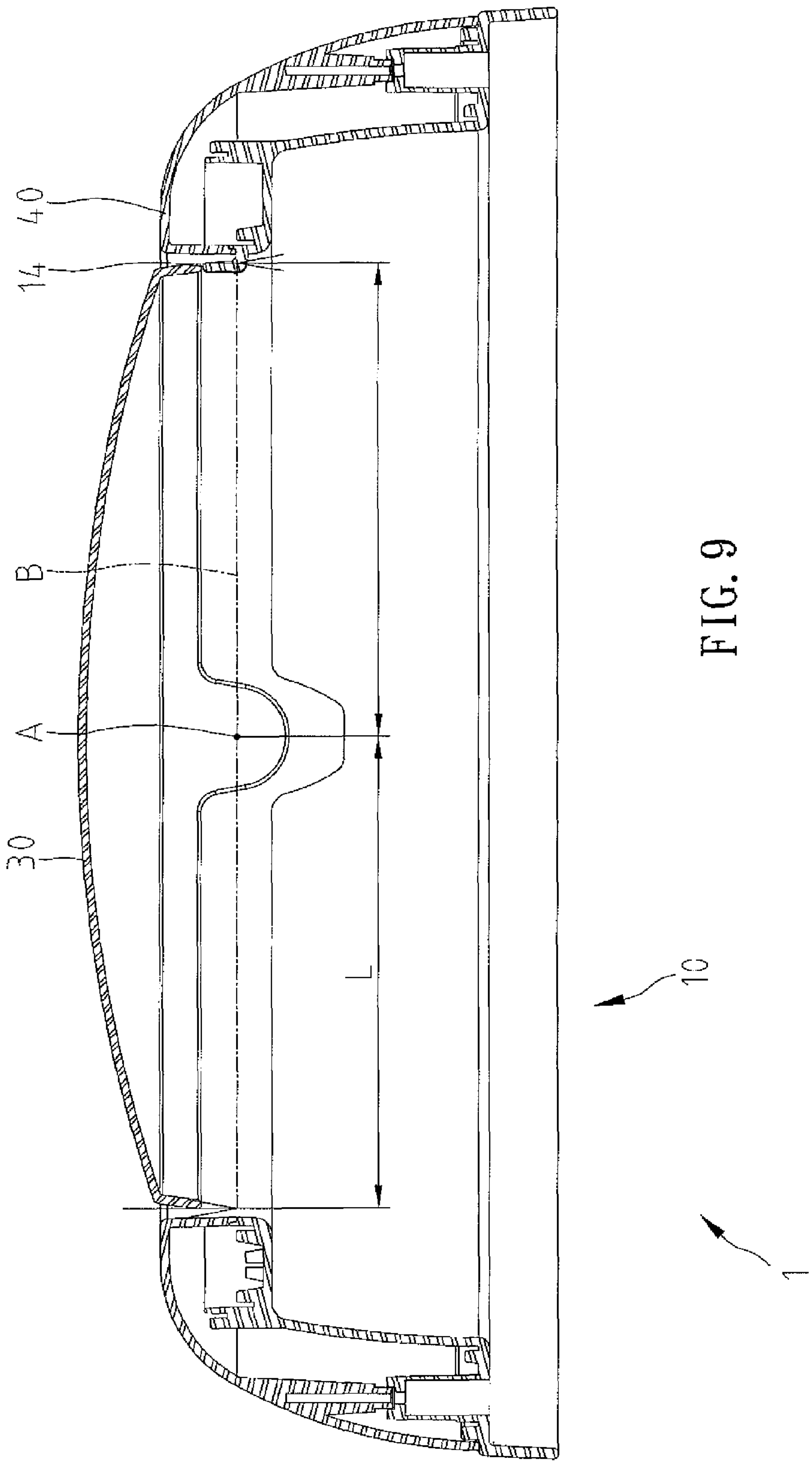
FIG. 9 is a further cross-sectional view of the lid, the lid engaging device and the protection cap.

Referring to the drawings, a container in accordance with the present invention includes a lid assembly 1 and a receptacle 2. The receptacle 2 includes a compartment formed therein, and the compartment has an open end and a closed end, and items are adapted to be put in the compartment of the receptacle 2 through the open end.

The lid assembly 1 includes a lid engaging device 10 mounted on the receptacle 2. The lid engaging device 10 includes a hole 11 extending therethrough, and the hole 11 is in communication with the open end of the receptacle 2 after engagement of the lid engaging device 10 with the receptacle 2. In this embodiment, the hole 11 has a substantially circular cross section. The lid engaging device 10 also includes a wall 111 delimiting the hole 11. In the preferred embodiment, the wall 111 has a substantially circular cross section. Furthermore, the wall 111 is utilized to pivotally connect with a lid 30. The lid 30 has a cross sectional area corresponding to that of the wall 111 and is adapted to be moved between an open position that enables items to be put in the receptacle 2 through the hole 11 of the lid engaging device 10 and a closed position in which the lid 30 prevents items to be put in the receptacle 2. Specifically, the wall 111 includes a first pivotal connection 12 and a second pivotal connection 13 opposite to the first pivotal connection 12. The lid 30 includes a first pivotal section 31 and a second pivotal section 32 extending from a circumferential edge thereof and disposed opposite to each other. The first pivotal section 31 is mounted on the first pivotal connection 12, and the second pivotal section 32 is mounted on the second pivotal connection 13, respectively.

The lid 30 is pivoted automatically by a transmission assembly 20. The transmission assembly 20 is mounted on an engaging section 15 of the lid engaging device 10. The engaging section 15 extends outward from an outer perimeter of the wall 111 to an outer perimeter 101 of the lid engaging device 10. The transmission assembly 20 includes a circuit board 21. The circuit board 21 is electrically connected to an electricity supply 3. The electricity supply 3 is also mounted on the engaging section 15. The transmission assembly 20 also includes a motor 22 connected to the circuit board 21, a transmission member 23 driven by the motor 22 and a sensor. The transmission member 23 includes a shaft 231 rotatably moved by the motor 22 and engaged in an engaging hole 33 formed in the first pivotal section 31. Thus, the lid 30 is adapted to be moved between the open position and the closed position under rotation of the shaft 231. In this embodiment, the shaft 231 includes a plurality of teeth 232, and the engaging hole 33 includes a plurality of recesses engaged with the plurality of teeth 232 respectively to allow the pivoting of the lid 30 under rotation of the shaft 231. Additionally, the sensor is utilized to transmit electric signals to the circuit board 21 so that the circuit board 21 controls a rotational direction of the motor 22 and a rotational direction of the lid 30. The sensor may be a heat-sensing device, a touch-sensing device, or a movement-sensing device. It is understood that all sensors are within the scope of the limitation.

In addition, the lid 30 includes a protrusion 34 formed on the second pivotal section 32. A position-limiting member 35 is engaged with the protrusion 34. Specifically, the protrusion 34 includes a connecting end 341, and the position-limiting member 35 includes a coupling section 351 including an aperture 354 in which the connecting end 341 is engaged in order to connect the position-limiting member 35 with the protrusion 34. As the lid 30 is pivoted, the position-limiting member 35 is rotated concurrently. Furthermore, the position-limiting member 35 includes a first limiting edge 352 and a second limiting edge 353 extending radially from the coupling section 351, with the first limiting edge 352 extending in a first direction and the second limiting edge 353 extending in a second direction. The lid engaging device 10 includes a stopper 16 selectively engaging with the first limiting edge 352 and the second limiting edge 353. Furthermore, the first limiting edge 352 is engaged with the stopper 16 as the lid 30 is in the closed position, while the second limiting edge 353 is engaged with the stopper 16 as the lid 30 is in the open position.

The container also includes a protection cap 40 mounted on the lid engaging device 10. The protection cap 40 is adapted to conceal the transmission assembly 20 and to protect the transmission assembly 20 from dust and against an external damage. The protection cap 40 includes a bottom edge fitted along the outer perimeter 101 of the lid engaging device 10 and a top edge fitted along the outer perimeter of the wall 111. The top edge includes an opening 42 having a cross sectional area greater than that of the lid 30 in order to enable the lid 30 to be moved to the open position without being interfered by the protection cap 40. The protection cap 40 further includes two holding sections 41, with one of the holding sections 41 retained on the shaft 231 and the other of the holding sections 41 retained on the protrusion 34 in order to prevent disengagement of the protection cap 40 from the lid engaging device 10.

Figure 10:
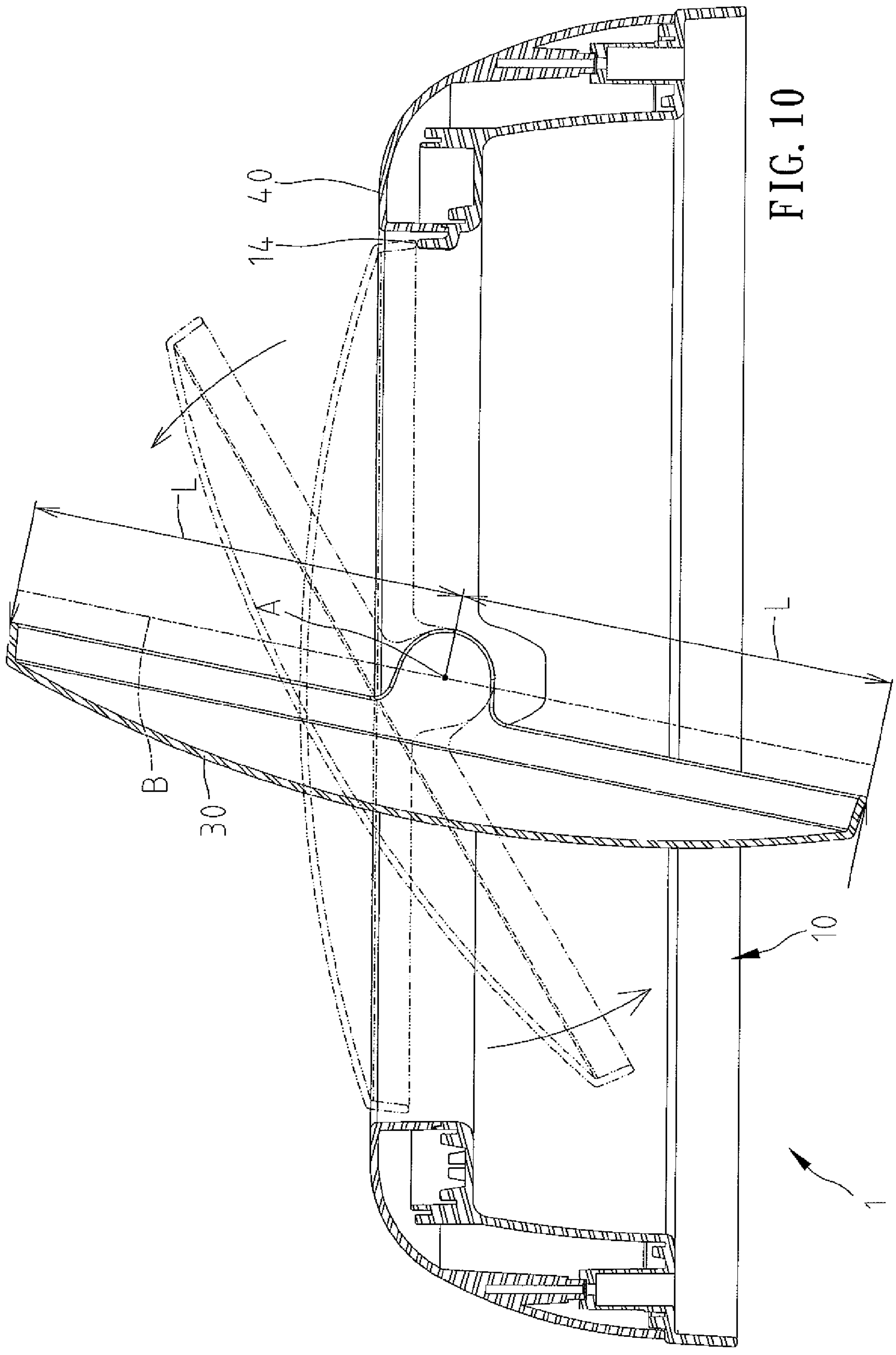
FIG. 10 is an extended cross-sectional view of FIG. 9 and shows the lid pivoted about an imaginary axis A
Figure 11:
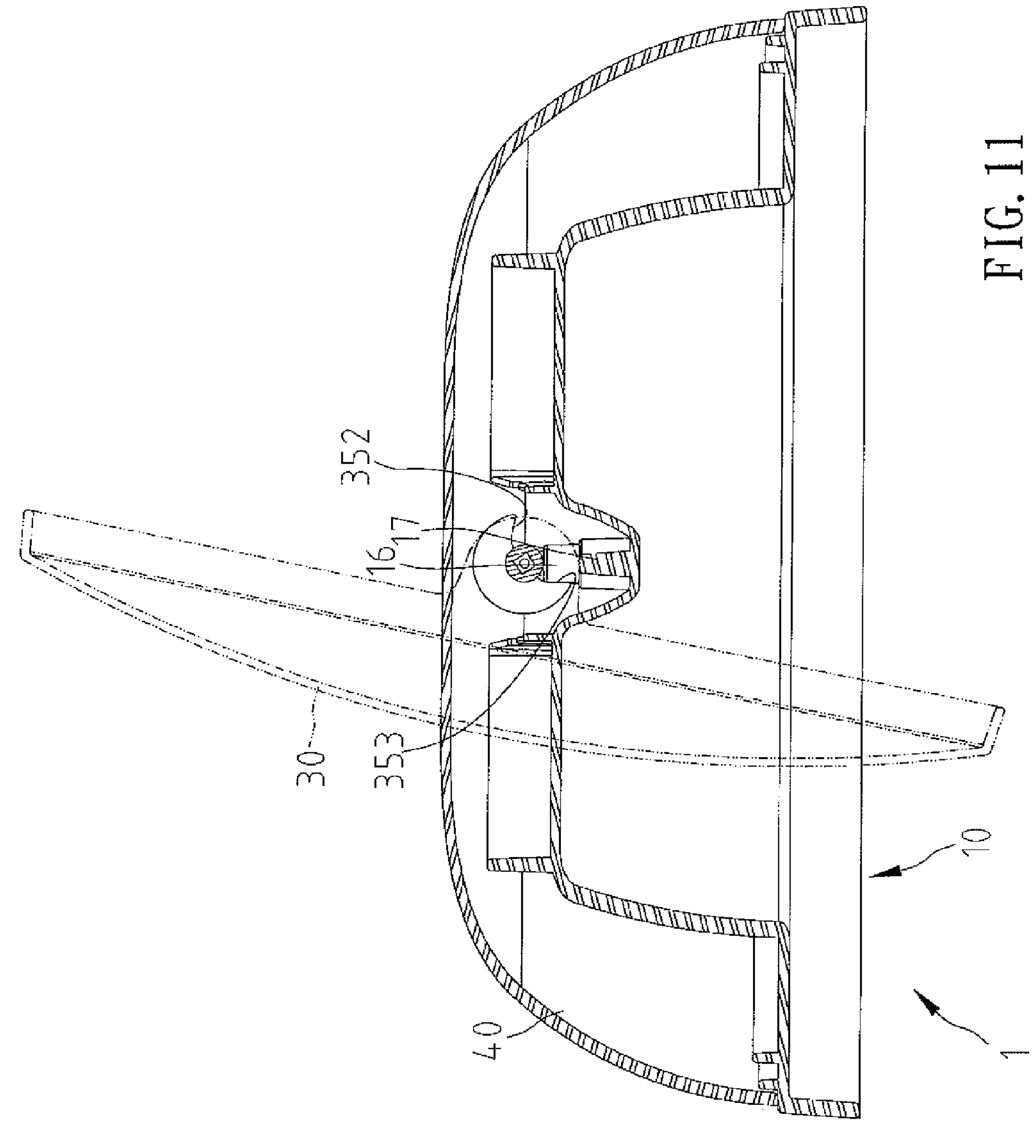
FIG. 11 is an extended cross-sectional view of FIG. 10 and shows the lid in a fully opened position.

The lid engaging device 10 also includes a blocking member 14 extending from and disposed within the outer perimeter of the wall 111. The blocking member 14 is engagable with the lid 30 to stop rotation of the lid 30. FIG. 10 shows the blocking member 14 engaged with the lid 30 when the lid 30 is in the closed position, whereas the blocking member 14 is disengaged from the lid 30 when the lid 30 is in the open position. Additionally, the lid engaging device 10 includes a retaining member 17 disposed in proximity to the stopper 16. The retaining member 17 is utilized to prevent disengagement of the position-limiting member 35 from the protrusion 34.

Referring to FIGS. 8 through 11, the lid 30 is pivotal about a longitudinal imaginary axis "A". The imaginary axis "A" extends between the first and second pivotal sections 31, 32. Likewise, the imaginary axis "A" extends between the shaft 231 and the protrusion 34. Accordingly, the shaft 231 is coaxial with the protrusion 34. Additionally, a longitudinal imaginary axis "B" extends between first and second points on the circumferential edge of the lid 30 and transverse to the imaginary axis "A". The imaginary axes "A" and "B" cross at an intersection. The intersection is spaced from the first point at a first radial distance and is spaced from the second point at a second radial distance. Preferably, the first and second radial distances are equal to L.

Furthermore, the lid 30 has a first portion and a second portion on two sides of the imaginary axis "A". The first portion has a first weight, and the second portion has a second weight. It is an aspect of the present invention that the first weight equals the second weight in order to enable the pivoting of the lid 30 to be stable and balanced. It is noticed that the first portion has the same dimension as the second portion in order to make the pivoting of the lid 30 stable and balanced.

Moreover, the transmission assembly 20 is not subject to a high load and a high torque in order to pivot the lid 30. Therefore, the transmission assembly 20 is energy saving. Additionally, the transmission assembly 20 is reliable and not liable to become damaged.

While the specific embodiments have been illustrated and described, numerous modifications come to mind without significantly departing from the spirit of invention, and the scope of invention is only limited by the scope of accompanying claims.

What is claimed is:

1. A lid assembly for a container comprising:

a lid engaging device;

a transmission assembly mounted on the lid engaging device, wherein the transmission assembly includes a circuit board, a motor connected to the circuit board, and a transmission member driven by the motor and including a rotatable shaft rotatably moved by the motor; and a lid including a first pivotal section and a second pivotal section extending from a circumferential edge thereof and disposed opposed to each other, with the first and second pivotal sections defining an imaginary axis "A" extended therebetween, with the first and second pivotal sections mounted on the lid engaging device, and with the rotatable shaft engaged with the first pivotal section and rotatable about the imaginary axis "A";

wherein the lid is pivoted automatically by the transmission assembly; and wherein the lid is pivotal about the imaginary axis "A" and is moveable between an open position that enables items to be put in the container and a closed position in which the lid prevents items to be put in the container.

2. The lid assembly as claimed in claim 1 wherein the lid includes a first portion and a second portion on two sides of the imaginary axis "A", with the first portion having a first weight and the second portion having a second weight, and with the first weight equaling the second weight.

3. The lid assembly as claimed in claim 2 wherein the imaginary axis "A" extends transversely to an imaginary axis "B" and crosses at an intersection, with the imaginary axis "B" extending between first and second points on the circumferential edge of the lid, with the intersection spaced from the first point at a first radial distance, with the intersection spaced from the second point at a second radial distance, and with the first and second radial distances equaling each other.

4. The lid assembly as claimed in claim 1 wherein the first pivotal section includes an engaging hole, with the rotatable shaft engaged in the engaging hole and rotatably moved by the motor, and with the lid pivoted under rotation of the rotatable shaft.

5. The lid assembly as claimed in claim 4 wherein the rotatable shaft includes a plurality of teeth, with the engaging hole including a plurality of recesses engaged with the plurality of teeth respectively.

6. The lid assembly as claimed in claim 1 wherein the transmission assembly includes a sensor transmitting electric signals to the circuit board, wherein the circuit board controls a rotational direction of the motor and a rotational direction of the lid.

7. The lid assembly as claimed in claim 1 wherein the lid includes a protrusion formed on the second pivotal section, with the protrusion engaged with a position-limiting member, with the position-limiting member rotatable with the lid and including a first limiting edge and a second limiting edge extending radially in two directions respectively, with the lid engaging device including a stopper selectively engaging with the first limiting edge and the second limiting edge, with the first limiting edge engaged with the stopper as the lid is in the closed position, and with the second limiting edge engaged with the stopper as the lid is in the open position.

8. The lid assembly as claimed in claim 1 further comprising a protection cap mounted on the lid engaging device, with the protection cap concealing the transmission assembly and including an opening having a cross sectional area greater than a cross sectional area of the lid in order to enable the lid to be moved to the open position without being interfered by the protection cap.

9. The lid assembly as claimed in claim 1 wherein the lid engaging device includes a hole extending therethrough and a wall delimiting the hole, with the lid pivotally connected on the wall, with the wall including a first pivotal connection and a second pivotal connection opposite to the first pivotal connection, and with the first pivotal section mounted on the first pivotal connection, and with the second pivotal section mounted on the second pivotal connection.

10. The lid assembly as claimed in claim 9 wherein the lid engaging device includes a blocking member extending from and disposed within an outer perimeter of the wall, with the blocking member engagable with the lid in order to stop rotation of the lid, with the blocking member engaged with the lid when the lid is in the closed position, and with the blocking member disengaged from the lid when the lid is in the open position.

11. The lid assembly as claimed in claim 6 wherein the sensor is a heat-sensing device.

12. The lid assembly as claimed in claim 6 wherein the sensor is a touch-sensing device.

13. The lid assembly as claimed in claim 6 wherein the sensor is a movement-sensing device.

* * * * *